(12) United States Patent
Singh et al.

(10) Patent No.: US 9,201,960 B2
(45) Date of Patent: Dec. 1, 2015

(54) VIRTUAL AGENT RESPONSE TO CUSTOMER INQUIRIES

(75) Inventors: Amit Singh, Irving, TX (US); Amar Nageswaram, Irving, TX (US); Mark Nicholas Studness, Basking Ridge, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 331 days.

(21) Appl. No.: 13/534,866

(22) Filed: Jun. 27, 2012

(65) Prior Publication Data

US 2014/0006438 A1  Jan. 2, 2014

(51) Int. Cl.
G06F 17/30 (2006.01)

(52) U.S. Cl.
CPC ...... *G06F 17/30861* (2013.01); *G06F 17/3089* (2013.01); *G06F 17/30864* (2013.01)

(58) Field of Classification Search
CPC ............ G06F 17/30864; G06F 17/30867; G06F 17/30; G06F 17/30699; G06F 17/30648; G06F 17/30702; G06F 17/30985; G06F 17/30274; G06F 17/30873; G06F 17/30029; G06F 17/30716
USPC .................. 707/705–712, 758–780
See application file for complete search history.

(56) References Cited

U.S. PATENT DOCUMENTS

| | | | |
|---|---|---|---|
| 7,536,389 B1 * | 5/2009 | Prabhakar et al. | 1/1 |
| 7,814,048 B2 * | 10/2010 | Zhou | G06F 17/30705 702/1 |
| 8,296,278 B2 * | 10/2012 | Abraham | 707/705 |
| 8,356,048 B2 * | 1/2013 | Hibbets et al. | 707/769 |
| 8,402,021 B2 * | 3/2013 | Nad et al. | 707/726 |
| 8,666,964 B1 * | 3/2014 | Alpert | G06F 17/30864 707/709 |
| 8,769,417 B1 * | 7/2014 | Robinson et al. | 715/751 |
| 2002/0138588 A1 * | 9/2002 | Leeds | 709/217 |
| 2003/0028525 A1 * | 2/2003 | Santos et al. | 707/3 |
| 2010/0063797 A1 * | 3/2010 | Cong | G06F 17/30734 704/9 |
| 2010/0174686 A1 * | 7/2010 | Acharya | G06F 17/30864 707/690 |
| 2010/0205168 A1 * | 8/2010 | Yang et al. | 707/709 |
| 2010/0235311 A1 * | 9/2010 | Cao et al. | 706/46 |
| 2011/0282880 A1 * | 11/2011 | Krichman et al. | 707/741 |
| 2012/0116982 A1 * | 5/2012 | Yoshida et al. | 705/304 |

* cited by examiner

*Primary Examiner* — Michelle Owyang

(57) ABSTRACT

A system includes a resource database that stores resource information representing solutions to a plurality customer inquiries and a destination database that stores destination information identifying a plurality of online forums available via a communications network. Each online forum includes a thread having at least one user post. The system further includes a language processor in communication with the resource database and the destination database. The language processor associates the at least one user post with at least one of the plurality of customer inquiries and selects from the resource database at least one solution to the customer inquiry identified. The language processor further generates a new post in the online forum with content from the resource information responsive to the customer inquiry associated with the at least one user post.

23 Claims, 2 Drawing Sheets

VIRTUAL AGENT RESPONSE TO CUSTOMER INQUIRIES

BACKGROUND

Telecommunications service providers often provide customers with various resources for resolving inquiries. Service providers make agents available via telephone, brick and mortar stores, online chat rooms, and online forums or message boards. Some customers, however, seek solutions from sources that are beyond the control of the service provider. For instance, some customers ask questions on online forums hosted by entities other than the service provider, leaving the service provider with little, if any, control over solutions or recommendations posted by those not affiliated with the service provider. By choosing this route, some customers receive inaccurate or incomplete answers to their inquiry. Moreover, the inaccurate or incomplete answers remain available in the online forum for others with similar questions to find, causing this misinformation to spread quickly.

DETAILED DESCRIPTION

A system includes a resource database that stores resource information representing solutions to a plurality customer inquiries and a destination database that stores destination information identifying a plurality of online forums available via a communications network. Each online forum includes a thread having at least one user post. The system further includes a language processor in communication with the resource database and the destination database. The language processor associates the at least one user post with at least one of the plurality of customer inquiries and selects from the resource database at least one solution to the customer inquiry identified. The language processor further generates a new post in the online forum with content from the resource information responsive to the customer inquiry associated with the at least one user post.

Figure 1:
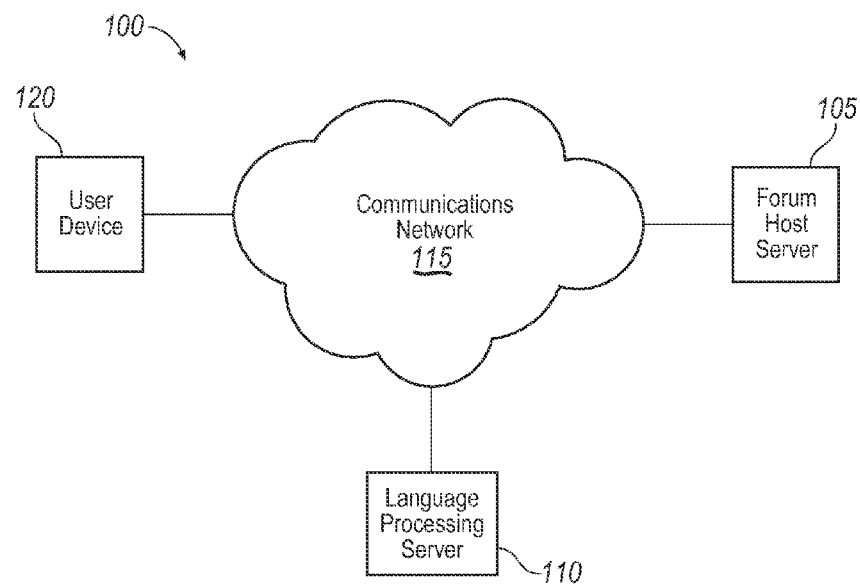
FIG. 1 illustrates an exemplary system for generating responsive answers to customer inquiries posted to an online forum.

FIG. 1 illustrates an exemplary system 100 that is configured to provide responsive answers to user questions posted to online forums. The system 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

The system 100 as illustrated in FIG. 1 includes a forum host server 105 and a language-processing server 110 configured to communicate with one another over a communications network 115.

The forum host server 105 may include any device configured to host an online forum. An online forum may present a message board or other form of discussion site where users can post information that other users can view and to which other users can respond. Some online forums require that each user be registered while others do not. Other forums may require that users who wish to actively participate in the forum register but will allow unregistered users to view posts by registered users. Further, some forums are moderated, meaning that one or more persons who are typically employed by or volunteer for the entity that hosts the online form review each post before it becomes viewable to others.

Forums may generally be arranged in a tree-like directory structure where each forum includes multiple categories, each category includes multiple threads, and each thread includes multiple posts. Therefore, each thread may represent a separate conversation within a particular category. The threads may be presented in order of activity, meaning that the thread with the most recent post will appear at the top of a list of threads presented to users viewing a particular category. Alternatively, the threads may be presented in order of relevance following, e.g., a search performed by a user wishing to view threads that include particular keywords.

Each thread includes one or more posts that may be displayed in, for instance, chronological order. That is, the original post that started the thread may be displayed at the top and additional posts, some of which may be responsive to the original post, may be displayed below the original post, generally in chronological order. In some threads, a post responsive to an earlier post may be placed directly below the earlier post to improve readability for the users. If multiple posts are responsive to an earlier post, each responsive post may be displayed below the earlier post in chronological order.

The forum host server 105 may be configured to present a graphical user interface to each user. The graphical user interface may allow the user to provide information that is used by the forum host server 105 to populate each post. The graphical user interface may be presented to each user via a user device 120, which may be owned and operated by the user and not the forum host server 105. The user device 120 may include a laptop or desktop computer, a tablet, a mobile device, etc. The user device 120 may present the graphical user interface when the user navigates to a particular location on the communications network 115 via a web browser. Alternatively, the user device 120 may present the graphical user interface via an application, i.e., separate from the web browser.

The language-processing server 110 may include any device or networked group of devices configured to access various threads posted in online forums hosted by the forum host server 105. The language-processing server 110 may be maintained by a telecommunications service provider or any other entity that has customers. In one possible implementation, the entity that maintains the forum host server 105 may be different than the entity that maintains the language-processing server 110. Therefore, the entity that maintains the language-processing server 110 may have limited, if any, control over the content posted to the online forum hosted via the forum host server 105.

As discussed in greater detail below, the language-processing server 110 may be configured to identify particular posts in the online forum that relate to any customer inquiry including customer inquiries about any products and services of the entity that maintains the language-processing server 110. Further, the language-processing server 110 may be configured to update the online forum, and in particular the thread where the post with the customer inquiry was identified. For instance, the language-processing server 110 may be configured to generate a new post that is responsive to the post with the customer inquiry. The new post generated by the language-processing server 110 may include a solution to the customer's inquiry.

The communications network 115 may include any combination of network devices that may be used to facilitate communication between and among the forum host server 105, the user device 120, and the language-processing server 110. The communications network 115 may include any number of terminals, links, nodes, etc. to transmit information between and among any device, including the forum host server 105 and the language-processing server 110, connected to the communications network 115. The communications network 115 may operate in accordance with any number of protocols. In one possible implementation, the communications network 115 includes a packet-switched network, a cellular network, or any combination of these or other types of networks.

Figure 2:
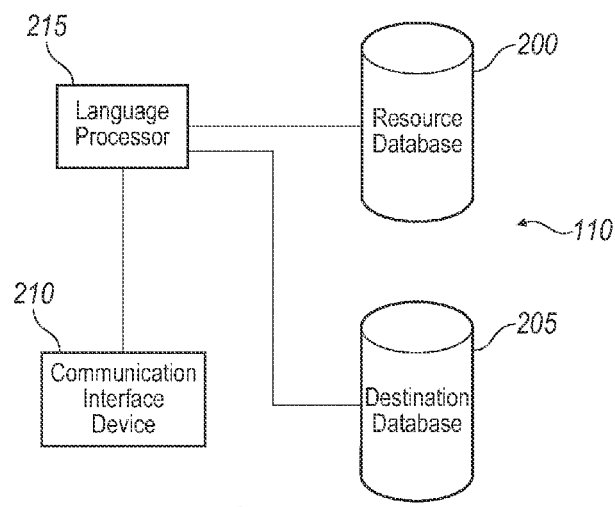
FIG. 2 illustrates an exemplary language-processing server used in accordance with the system of FIG. 1.

FIG. 2 is a block diagram of an exemplary language-processing server 110. As illustrated, the language-processing server 110 includes a resource database 200, a destination database 205, a communication interface device 210, and a language processor 215.

The resource database 200 may include any device or networked group of devices configured to store information that represents solutions to a plurality of customer questions or inquiries. The solutions may be the same or similar to those presented to customers who call customer service or appear in person to speak with a customer service representative. The resource database 200 may arrange the information in a digital format to allow access of the information by a computing device. Further, each solution may be associated with a customer inquiry. Therefore, a computing device that queries the resource database 200 for a particular customer inquiry may identify and access the associated solution.

The resource database 200 may be configured to receive updated solutions or information that may be used to supplement solutions. For instance, as new products or services are introduced, or as new solutions to known customer inquiries are developed, the resource database 200 may be updated accordingly. The resource database 200 may be configured to receive information from any computing device in communication with or with access to the resource database 200.

The destination database 205 may include any device or networked group of devices configure to store destination information, which may identify a plurality of online forums. For instance, the destination information stored in the destination database 205 may identify online forums, either directly or indirectly, using a network address, such as an IP address, associated with the online forum or a website that hosts the online forum. As discussed above, each online forum includes at least one thread having at least one user post. The online forums represented by the destination information may be maintained and updated manually to represent online forums where customers are likely to post inquiries.

The destination database 205 may associate each of the plurality of online forums with a priority relative to the others. The priority may represent an order in which each online forum should be accessed, as described below. The priority may further or alternatively represent how often each online forum should be accessed. Thus, the priority may be used to generate a schedule for accessing each online forum. Like the information stored in the resource database 200, the information in the destination database 205 may be stored in a digital format so that the destination information is accessible to a computing device with rights to access the destination database 205.

The communication interface device 210 may include any number of devices configured to facilitate communication over the communications network 115. For instance, the communication interface device 210 may include any number of routers, switches, gateways, etc. Further or alternatively, the communication interface device 210 may include any type of network interface controller that includes hardware, software, or both, to facilitate any number of data link layer standards such as Wi-Fi or Ethernet. Moreover, the communication interface device 210 may operate in accordance with any number of protocols.

The language processor 215 may include any device in communication with and configured to access the resource database 200 and the destination database 205. Moreover, the language processor 215 may be in communication with the communications interface device. Accordingly, the language processor 215 may be configured to receive data from and transmit data to various devices over the communications network 115. In general, the language processor 215 may be responsible for identifying posts in the online forum that include customer inquiries and generating a new post that is responsive to the identified post.

In one possible approach, the language processor 215 may be configured to query the destination database 205 to determine which online forums to crawl. The language processor 215 may generate a schedule of online forums based at least in part on the priority assigned to each online forum in the destination database 205. In accordance with the schedule, the language processor 215 may navigate to each online forum based on, e.g., the network location identified by the destination information using the communication interface device 210 and crawl the online forum. Crawling may include selecting any of the following: selecting a category of threads; selecting a particular thread within the selected category, if any; and parsing posts within the selected thread. By parsing one or more posts within the selected thread, the language processor 215 may be configured to identify one or more keywords that appear in each post.

Using the information stored in the resource database 200, the language processor 215 may be configured to determine a context of each post based on the keywords identified. For instance, the keywords may suggest to the language processor 215 that the post includes a customer inquiry about a product or service. Further, the context may indicate that the post is directed to troubleshooting a particular issue the customer is having with the product or service, or alternatively, that the customer is seeking advice on how to purchase a product or service. Thus, the language processor 215 may be configured to determine that the customer inquiry includes one or more troubleshooting questions, one or more purchasing questions, or sometimes a mix of both types of questions. Accordingly, the language processor 215 may use the context to normalize the customer inquiry.

With the context identified and the customer inquiry normalized, the language processor 215 may be configured to query the resource database 200 for solutions to the customer inquiry identified in the post. The language processor 215 may query the resource database 200 using the normalized customer inquiry, which may include the keywords from the user post as well as additional keywords typically associated with the customer inquiry. As discussed above, providing context to the post from the keywords normalizes the customer inquiry, and normalizing the customer inquiry may increase the likelihood that a responsive solution to the user post will be found in the resource database 200. The language processor 215 may search the resource database 200 for solutions associated with the normalized customer inquiry. The result of the search may include one or more solutions that are responsive to the user post. The language processor 215 may associate the solutions resulting from the search with the customer inquiry. Sometimes, the query of the resource database 200 may result in one solution to the normalized customer inquiry. Other times, however, multiple solutions are uncovered during the query. In those instances, the language processor 215 may be configured to select one or more solutions based on a relevance score or other metric. If the language processor 215 determines that multiple solutions are responsive to the normalized customer inquiry, based, e.g., on relevancy, multiple solutions may be selected. If too many solutions are uncovered, which may occur if the customer inquiry, even normalized, is vague or raises a number of issues in a single post, the language processor 215 may determine that the best solution is for the customer to contact a customer service representative by telephone or in person at a customer service site. The same solution—contact a customer service representative—may also be selected if the language processor 215 is unable to find any customer inquiries or associate a context to the user post. Once one or more solutions have been identified, the language processor 215 may be configured to generate a new post in the same thread as the identified post. The language processor 215 may populate the new post with the solution identified from the resource information following the query of the resource database 200.

The language processor 215 may, in one possible implementation, populate the new post with a brief description of the context associated with the customer inquiry. That is, the new post may include a statement that summarizes or paraphrases the customer inquiry. The brief description of the context may indicate to a moderator that the post by the language processor 215 is a legitimate response to the customer inquiry. One example summary for a troubleshooting question may be as follows: "It looks as though you are experiencing a problem with your cable service." After the summary, the language processor 215 may include a list of steps that would be presented to the customer if the customer were to contact a customer service representative via, e.g., telephone. If the customer inquiry is related to a purchasing question, the summary may include a statement such as: "That item can be purchased at . . . " followed by a link to an online retailer selling the requested product or a physical address for a retailer.

Before crawling any particular thread, the language processor 215 may be configured to determine whether the thread is an open thread or a closed thread. Open threads include those where users may post a reply to any message in the thread. In a closed thread, however, new posts are not accepted. If the thread is open, the language processor 215 may parse the text in each post to identify keywords as discussed above. The language processor 215 may be configured to skip closed threads.

Solutions to a particular customer inquiry can change over time. That is, the best solution for a particular inquiry may change as new products and services are developed. In one possible implementation, the language processor 215 may be configured to update previously generated posts with the new information. Updated solutions may be presented to the resource database 200 and associated with a particular customer inquiry. The language processor 215 may be configured to detect that an updated solution has been presented and determine whether a previous solution for that particular inquiry was relied upon to generate a post in an online forum. If so, the language processor 215 may be configured to update the previously generated post with the updated solution, or alternatively, generate a new post providing the updated solution. In one possible approach, the language processor 215 may be configured to only generate the new post providing the updated solution if the thread where the previously generated post is located is still open.

A history of previously generated posts may be stored in the resource database 200, destination database 205, or another data store (not shown). The history may include the name of the forum, the date and time stamp of the user post, the keywords used to determine the context, the normalized customer inquiry, the selected solution, and the text of the previously generated post. Upon receipt of an indication that the solution has changed, the language processor 215 may be configured to query the history of previously generated posts to identify those of which may require updating. The language processor 215 may use the date and time stamp of the previously generated post to determine whether the previously generated post has already been updated. Alternatively, the history may further include some indication of the date and time when the post was last updated, which may be the same as the date and time the post was generated.

In some instances, the language processor 215 may be configured to actively seek out updates to the resource database 200. Instead of passively waiting for an indication that a solution in the resource database 200 has been updated, the language processor 215 may periodically query the resource database 200 for normalized customer inquiries previously searched. The language processor 215 may be configured to determine the date and time at which a solution was uploaded to the resource database 200 and compare that date and time to the date and time stamps of one or more previously generated posts relying on the now updated solution. If the language processor 215 determines that the previously generated post predates the updated solution, the language processor 215 may take an appropriate action, such as checking whether the thread is open, and if so, updating the post with the new solution.

In some instances, such as for quality purposes, the language processor 215 may be configured to transmit the user post identified as including the customer inquiry and the new post generated by the language processor 215 to the resource database 200. A technician may access the user post and the new post to determine whether the language processor 215 responded appropriately. If necessary, the technician may supplement or otherwise revise the post generated by the language processor 215. The revisions may be uploaded to the resource database 200, which may prevent the language processor 215 from repeating a mistake.

In general, computing systems and/or devices, such as forum host server 105, the language-processing server 110, the user device 120, the language processor 215, etc., may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figures 3, 4:
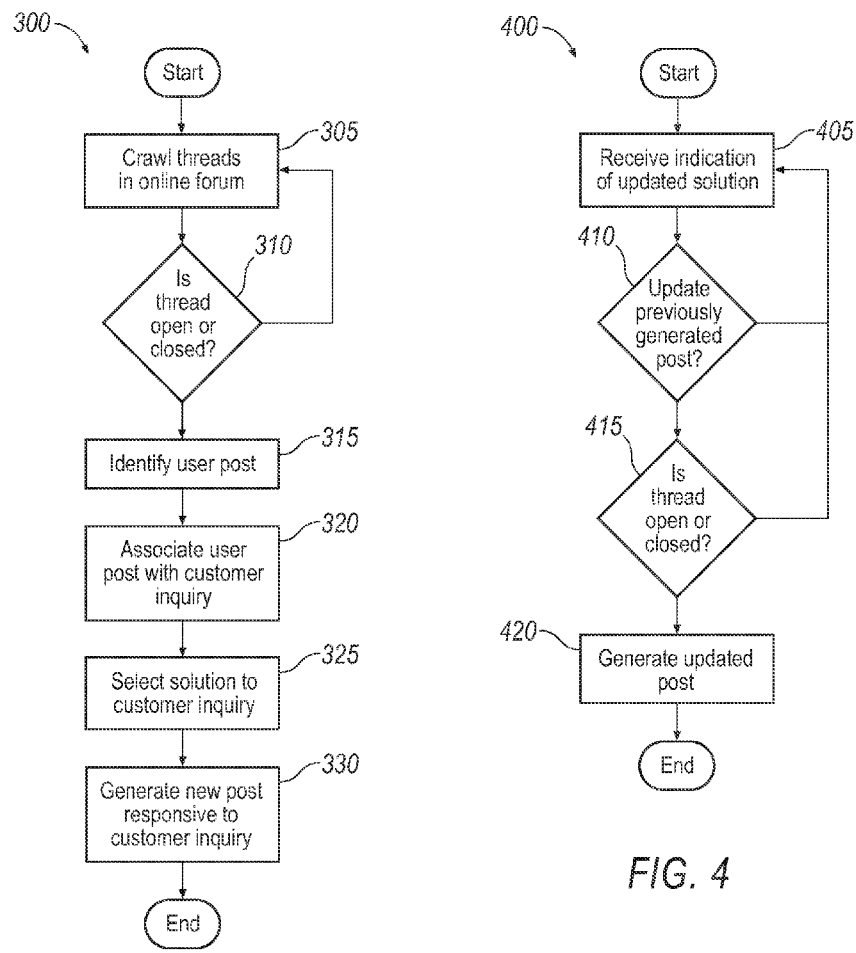
FIG. 3 illustrates a flowchart of an exemplary process that may be implemented by the language-processing server of FIG. 1 to generate new posts.
FIG. 4 illustrates a flowchart of an exemplary process that may be implemented by the language-processing server of FIG. 1 to update previously generated posts.

FIG. 3 illustrates a flowchart of an example process 300 that may be implemented by the language-processing server 110, and in particular, the language processor 215.

At block 305, the language processor 215 may begin crawling the plurality of threads in the online forum. For instance, the language processor 215 may determine which online forums to crawl, the categories within each online forums that are likely to include relevant customer inquiries, the order in which to crawl the online forums, etc., from the destination information stored in the destination database 205. As discussed above, the destination information may assign a priority to the online forums or particular threads within the online forum, and using that priority, the language processor 215 may determine a schedule that can be used to crawl the threads identified in a particular order.

At block 310, the language processor 215 may determine whether the thread is an open thread or a closed thread. As discussed above, an open thread will allow new posts while a closed thread will not. If the thread is open, the process 300 may continue at block 315. If the thread is closed, the process may return to block 305 so that the next thread may be selected from the destination information.

At block 315, the language processor 215 may identify at least one user post in the plurality of crawled threads that is likely to contain a customer inquiry. For instance, the language processor 215 may determine that a particular user post includes various keywords that indicate a customer inquiry. Accordingly, the language processor 215 may, in one possible implementation, parse each post in a particular thread and identify a plurality of keywords found in the post.

At block 320, the language processor 215 may associate the user post with one or more of the customer inquiries. Generally, the language processor 215 may query the resource database 200 for the keywords found by parsing the user post to determine whether the language found in the post is similar to that of any customer inquiries stored in the resource database 200. For instance, the language processor 215 may determine the context of the user post, which may be used to normalize the customer inquiry and conduct a more precise query of the resource database 200. To increase the likelihood that the language processor 215 selects the correct customer inquiry, the language processor 215 may determine the context of the post using the keywords identified, as discussed above. For instance, the language processor 215 may determine whether the post is asking a purchasing question or a troubleshooting question. The language processor 215 may query the resource database 200 for the normalized customer inquiry, alone or in addition to the keywords from the user post, to identify responsive solutions. The language processor 215 may further associate the user post with multiple customer inquiries if, e.g., the user raises multiple issues in a single post or if the user post is too vague for the language processor 215 to understand the inquiry. Alternatively, the language processor 215 may determine that the user post does not raise any customer inquiries stored in the resource database 200.

At block 325, the language processor 215 may select at least one solution to the customer inquiry or inquiries identified. The result of querying the resource database 200 may result in the association of multiple solutions to the user post. The language processor 215 may select one of the solutions, such as the solution determined to be of the highest relevance based on a relevance score or other metric. Moreover, if the user post raises multiple inquiries, the language processor 215 may select more than one solution, especially in scenarios where the most relevant solutions have similar relevance scores. If the user post raises a large number of issues or if the user post is too vague, the language processor 215 may determine that the best solution is for the customer to contact a customer service representative by telephone or by visiting a customer service site. The language processor 215 may also determine that the best solution is to contact a customer service representative if no customer inquiries are found following block 320.

At block 330, the language processor 215 may generate a new post in the thread with content that is responsive to the customer inquiry associated with the user post. That is, the language processor 215 may populate a new post with a summary of the customer inquiry and the selected solution from the resource database 200. Once populated, the language processor 215 may submit the new post to the forum host server 105 for posting in the thread.

Following block 330, the process 300 may end, or alternatively, may return to block 305.

FIG. 4 illustrates a flowchart of an exemplary process 400 that may be implemented by the language processor 215 to update previously generated posts with updated solutions.

At block 405, the language processor 215 may receive an indication that updated solution has been presented to the resource server. The updated solution may be presented to the resource database 200 and associated with a particular customer inquiry. The language processor 215 may detect that an updated solution has been presented either actively by seeking out new information added to the resource database 200. In the alternative, the language processor 215 may receive a passive indication that the updated solution was presented. That is, the language processor 215 may receive a message form the resource server that the solution was updated.

At decision block 410, the language processor 215 may determine whether to update a previously generated post. That is, the language processor 215 may determine whether a previously generated post includes an outdated solution relative to the updated solution presented to the resource database 200. One way to determine whether the solution of the previously generated post is outdated is to compare a date and time stamp of the updated solution to a date and time stamp of the previously generated post. The date and time stamp of the previously generated post may be stored in a history in the resource database 200, the destination database 205, or another data store (not shown). If the solution is outdated, the process 400 may continue at block 415. If not, the process 400 may end or return to block 405 to await another updated solution.

At decision block 415, the language processor 215 may determine whether the thread in which the previously generated post is located is an open thread or a closed thread. If an open thread, the process 400 may continue at block 420. If closed, the language processor 215 may conclude that the thread will not accept more posts or updated posts, so the process 400 may end or return to block 405 to await another updated solution.

At block 420, the language processor 215 may generate an updated post with the updated solution. In one possible approach, the updated post may include a brief summary indicating that the solution has been updated. Moreover, the updated may post may replace the previously generated post or alternatively may include a new post altogether. If the updated post is new to the thread, the previously generated post may be deleted so that only the updated post with the updated solution remains.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising:
    a resource database configured to periodically receive and store solutions for a plurality of customer inquiries;
    a destination database configured to periodically receive and store destination information identifying a plurality of online forums available via a communications network, wherein the plurality of online forums is associated with at least one network address in the communication network, wherein each online forum includes at least one thread having a plurality of user posts and has a respective priority relative to other forums of the plurality of online forums,
        wherein each post includes at least one of the solutions or at least one of the plurality of customer inquiries,
        wherein the respective priority represents a predefined order, wherein the predefined order is part of a schedule for accessing the plurality of online forums,
        wherein the destination information includes the respective priority and the schedule, and
        wherein the resource database is discrete from the destination database; and
    a language processing server including a hardware processor, wherein the language processing server is in communication with the resource database and the destination database, and wherein the processor is configured to:
        query the destination database for the schedule of the plurality of online forums;
        query the resource database for solutions for at least one of the plurality of customer inquiries;
        navigate at least a portion of the plurality of online forums according to the schedule to gather relevant user posts of the plurality of user posts for the at least one of the plurality of customer inquiries;
        identify a particular post of the gathered relevant user posts that corresponds to one of the at least one of the plurality of customer inquiries;
        associate the particular post with the corresponding one of the at least one of the plurality of customer inquiries;
        select solutions from the resource database based the corresponding one of the at least one of the plurality of customer inquiries;
        generate a new post based on a relevancy between the selected solutions and corresponding one of the at least one of the plurality of customer inquiries in one or more thread of the plurality of online forums;
periodically detect an updated solution from the solutions of the resource database;
query a history associated with the plurality of user posts to identify at least one user post of the plurality of user posts having a user post time stamp that predates a solution time stamp of the updated solution;
in response to identifying the predated at least one user post, check whether at least one thread, that includes the predated at least one user post, is open;
if the at least one thread is open, generate at least one updated post, based on the updated solution, in the at least one thread in response to a corresponding one of the plurality of customer inquiries, and
if the at least one thread is closed, the generate at least one updated post is not performed.

2. A system as set forth in claim 1, wherein the processor is further configured to crawl the plurality of online forums identified by the destination information.

3. A system as set forth in claim 1, wherein the processor is further configured to access the destination information from the destination database.

4. A system as set forth in claim 1, wherein the processor is further configured to navigate to a plurality of network locations via the at least one network address identified by the destination information.

5. A system as set forth in claim 1, wherein the processor is further configured to determine the schedule and transmit the schedule to the destination database.

6. A system as set forth in claim 1, wherein the processor is further configured to parse one or more user post to identify a plurality of keywords.

7. A system as set forth in claim 6, wherein the processor is further configured to determine a context from the keywords identified.

8. A system as set forth in claim 7, wherein the context indicates that the one or more user post is associated with a purchasing question.

9. A system as set forth in claim 7, wherein the context indicates that the one or more user post is associated with a troubleshooting question.

10. A system as set forth in claim 1, wherein the processor is further configured to generate another new post with content that includes at least one of the plurality of customer inquiries associated with one or more user post.

11. A system as set forth in claim 1, wherein the processor is further configured to transmit solutions in the new post and the at least one updated post to the resource database.

12. A system as set forth in claim 1, wherein the processor is further configured to skip the at least one thread if the at least one thread is closed.

13. A system as set forth in claim 1, wherein the processor is further configured to store the new post and the at least one updated post to the history.

14. A method comprising:
providing a resource database configured to periodically receive and store solutions for a plurality of customer inquiries;
providing a destination database configured to periodically receive and store destination information identifying a plurality of online forums available via a communications network, wherein the plurality of online forums is associated with at least one network address in the communication network, wherein each online forum includes at least one thread having a plurality of user posts and has a respective priority relative to other forums of the plurality of online forums, wherein each post includes at least one of the solutions or at least one of the plurality of customer inquiries,
wherein the respective priority represents a predefined order, wherein the predefined order is part of a schedule for accessing the plurality of online forums, wherein the destination information includes the respective priority and the schedule, and wherein the resource database is discrete from the destination database;
providing a language processing server including a hardware processor, wherein the language processing server is in communication with the resource database and the destination database;
querying, by the hardware processor, the destination database for the schedule of the plurality of online forums;
querying, by the hardware processor, the resource database for solutions for at least one of the plurality of customer inquiries;
navigating, by the hardware processor, at least a portion of the plurality of online forums according to the schedule to gather relevant user posts of the plurality of user posts for the at least one of the plurality of customer inquiries;
identifying, by the hardware processor, a particular post of the gathered relevant user posts that corresponds to one of the at least one of the plurality of customer inquiries;
associating, by the hardware processor, the particular post with the corresponding one of the at least one of the plurality of customer inquiries;
selecting solutions from the resource database based the corresponding one of the at least one of the plurality of customer inquiries in one or more thread of the plurality of online forums;
generating, by the hardware processor, a new post based on a relevancy between the selected solutions and corresponding one of the at least one of the plurality of customer inquiries;
periodically detecting, by the hardware processor, an updated solution from the solutions of the resource database;
querying, by the hardware processor, a history associated with the plurality of user posts to identify at least one user post of the plurality of user posts having a user post time stamp that predates a solution time stamp of the updated solution;
in response to identifying the predated at least one user post, checking, by a language processing server, whether at least one thread, that includes the predated at least one user post, is open;
if the at least one thread is open, generating, by the hardware processor, at least one updated post, based on the updated solution, in the at least one thread and in response to a corresponding one of the plurality of customer inquiries, and
if the at least one thread is closed, the generating, by the hardware processor, at least one updated post is not performed.

15. A method as set forth in claim 14, further comprising crawling, by the hardware processor, the plurality of threads in the online forum according to the schedule.

16. A method as set forth in claim 14, further comprising determining, by the hardware processor, the schedule;
transmitting, by the hardware processor, the schedule to the destination database.

17. A method as set forth in claim 14, further comprising:
parsing one or more user post; and identifying a plurality of keywords from the one or more user post.

18. A method as set forth in claim 17, further comprising determining a context of the one or more user post based at least in part on the plurality of keywords identified.

19. A method as set forth in claim 18, wherein the context indicates that the one or more user post is associated with at least one of a purchasing question and a troubleshooting question.

20. A method as set forth in claim 14, further comprising: skipping the at least one thread if the at least one thread is closed.

21. A method as set forth in claim 20, further comprising storing the new post and the at least one updated post to the history.

22. A system comprising:
a forum host server including a hardware processor is configured to host a plurality of online forums, wherein each forum includes at least one thread having a plurality of user posts and has a respective priority relative to other forums of the plurality of online forums; and
a language processing server in communication with the forum host server via a communications network, wherein the plurality of online forums is associated with at least one network address in the communications network,
wherein the language processing server includes:
a resource database configured to periodically receive and store solutions for a plurality customer inquiries;
a destination database configured to periodically receive and store destination information identifying the plurality of online forums hosted by the forum host server,
wherein each post includes at least one of the solutions or at least one of the plurality of customer inquiries,
wherein the respective priority of respective forum represents a predefined order, wherein the predefined order is part of a schedule for accessing the plurality of online forums
wherein the destination information includes the respective priority and the schedule, and
wherein the resource database is discrete from the destination database; and
a hardware processor configured to:

query the destination database for the schedule of the plurality of online forums;

query the resource database for solutions for at least one of the plurality of customer inquiries;

navigate at least a portion of the plurality of online forums according to the schedule to gather relevant user posts of the plurality of user posts for the at least one of the plurality of customer inquiries;

identify a particular post of the gathered relevant user posts that corresponds to one of the at least one of the plurality of customer inquiries;

associate the particular post with the corresponding one of the at least one of the plurality of customer inquiries;

select solutions from the resource database based the corresponding one of the at least one of the plurality of customer inquiries;

generate a new post based on a relevancy between the selected solutions and corresponding one of the at least one of the plurality of customer inquiries in one or more thread of the plurality of online forums;

periodically detect an updated solution from the solutions of the resource database;

query a history associated with the plurality of user posts to identify at least one user post of the plurality of user posts having a user post time stamp that predates a solution time stamp of the updated solution;

in response to identifying the predated at least one user post, check whether at least one thread, that includes the predated at least one user post, is open;

if the at least one thread is open, generate at least one updated post, based on the updated solution, in the at least one thread in response to a corresponding one of the plurality of customer inquiries, and if the at least one thread is closed, the generate at least one updated post is not performed.

23. A system as set forth in claim 22, wherein the forum host server and the language processing server both include a plurality of discrete computing devices.

* * * * *